US 6,732,444 B2

(12) United States Patent
Allen

(10) Patent No.: US 6,732,444 B2
(45) Date of Patent: May 11, 2004

(54) TAPERED SLIDING DOVETAIL TOOL AND KIT INCLUDING SUCH TOOL

(76) Inventor: Patrick J. Allen, 8667 Acturus Dr., Cincinnati, OH (US) 45249

( * ) Notice: Subject to any disclaimer, the term of this patent is extended or adjusted under 35 U.S.C. 154(b) by 0 days.

(21) Appl. No.: 10/215,526

(22) Filed: Aug. 9, 2002

(65) Prior Publication Data

US 2004/0025362 A1 Feb. 12, 2004

(51) Int. Cl.[7] .................................................. G01B 3/14
(52) U.S. Cl. ........................... 33/638; 33/562; 144/372
(58) Field of Search ........................... 33/638, 626, 628, 33/562, 563, 566, 531; 144/359, 363, 372

(56) References Cited

U.S. PATENT DOCUMENTS

| 2,764,191 A | 9/1956 | Hartmann |
| 3,376,650 A | 4/1968 | Cook |
| 3,878,875 A | 4/1975 | McCord, Jr. |
| 4,435,906 A | * 3/1984 | Mori ............................ 33/628 |
| 4,479,523 A | 10/1984 | Peterson et al. |
| 4,603,717 A | 8/1986 | Thomas |
| 5,454,331 A | 10/1995 | Green |
| 6,243,963 B1 | * 6/2001 | Jones et al. .................... 33/562 |

* cited by examiner

Primary Examiner—Christopher W. Fulton
(74) Attorney, Agent, or Firm—David M. Weirich

(57) ABSTRACT

A template for making tapered sliding dovetail pins from a workpiece. The template includes a longitudinal centerline, a pair of side edges, a workpiece side, a tool side, a minor end having a minor width and a major end having a major width that is larger than the minor width such that the template has a taper in width from the major end to the minor end, and at least one stabilizing member disposed on the workpiece side of the template for holding the template in place while the sliding dovetail pin is being formed from the workpiece.

25 Claims, 5 Drawing Sheets

TAPERED SLIDING DOVETAIL TOOL AND KIT INCLUDING SUCH TOOL

FIELD OF THE INVENTION

The present invention is directed to a device useful for woodworking and other crafts. More particularly, the present invention relates to a tool or kit including several tools that can be used to form dovetail joints in workpieces, including sliding dovetail joints.

BACKGROUND

In woodworking and other crafts, it is often desirable to form dovetail joint between two workpieces and/or other structures. The dovetail joint is typically made up of a dovetail pin and a dovetail groove. The dovetail is typically cut with a slight interference so that the joint fits snuggly together to form a locking joint. The dovetail joint can be a self locking joint and is often used in drawer construction. In such embodiments, a series of interlocking pins are generally cut into the end of one work piece that fit into a matching set of dovetail grooves cut into a corresponding workpiece. In such applications, the ends of two workpieces are typically joined across their width at their edges to form a 90° joint.

A second less commonly found dovetail joint is the tapered sliding dovetail joint. One place where this type of joint is used is in the construction of cabinets and bookcases, where fixed shelves are joined to the sides of the structure. This type of joint is difficult to prepare, so it is rarely used except by the most skilled and experienced craftsmen. The tapered sliding dovetail joint is typically used to join the face of one workpiece to the end of another workpiece. In this application a dovetail groove is formed in the face of one workpiece. The dovetail groove starts on the edge of the workpiece and continues across the width of the workpiece generally terminating short of the opposite edge of the workpiece, so as to not weaken the workpiece. A single matching dovetail pin is formed on the end of the corresponding workpiece. The pin is typically configured to stop short of the edge of the workpiece so that it matches the dovetail groove formed in the face of the other workpiece. It is preferred that the dovetail groove and dovetail pin be tapered evenly through their length to allow the work pieces to be assembled to each other and to allow the proper interference of fit to be achieved to form a locking joint. The taper makes it very difficult for the average woodworker to form reliably with conventional tools. The workpieces are joined by inserting the minor end of the pin into open dovetail groove and sliding them together to achieve the desired fit.

Due to the difficulty in forming suitable tapered pins and grooves for use in sliding dovetail joints, it would be desirable to provide devices for easily forming both the tapered sliding dovetail pin and the matching tapered sliding dovetail groove of a tapered sliding dovetail joint. Further, the device provides a means for accurately tapering the pin and/or groove of the workpiece so as to provide a snug fit between the pin and groove. The present invention also provides a kit including the tooling necessary to make sliding dovetail joints with conventional hand-held tools, such as routers.

SUMMARY OF THE INVENTION

The present invention provides a template for making tapered sliding dovetail pins in a workpiece, the template comprising a longitudinal centerline, a pair of side edges, a workpiece side, a tool side, a minor end having a minor width and a major end having a major width that is larger than the minor width such that the template has a taper in width from the major end to the minor end, and at least one stabilizing member disposed on the workpiece side of the template for holding the template in place while the sliding dovetail pin is being formed from the workpiece.

The present invention may also be presented in the form of a kit for making tapered sliding dovetail joints including a pin guide, as described above a groove guide made from a plate having a length, a width, a thickness, a top surface, a bottom surface, a perimeter and at least one groove having a longitudinal centerline, a pair of groove edges, a first end having a minor width and a second end having a major width that is larger than the minor width, wherein the first end of the groove is located inward from the perimeter of the plate.

The kit may also include a router stabilizer comprising a first rail member, a second rail member, and at least one spacing element, the spacing element providing a means for holding the first rail member and the second rail member in a desired configuration with respect to each other. The kit may also include a dept of cut gage, instructions for using pin guide and/or the groove guide and/or a package for storing the pin guide and the groove guide.

DESCRIPTION OF THE DRAWINGS

While the specification concludes with claims pointing out and particularly claiming the present invention, it is believed that the invention will be better understood by referring to the following drawings taken in conjunction with the accompanying specification.

DETAILED DESCRIPTION OF THE INVENTION

Figure 1A:
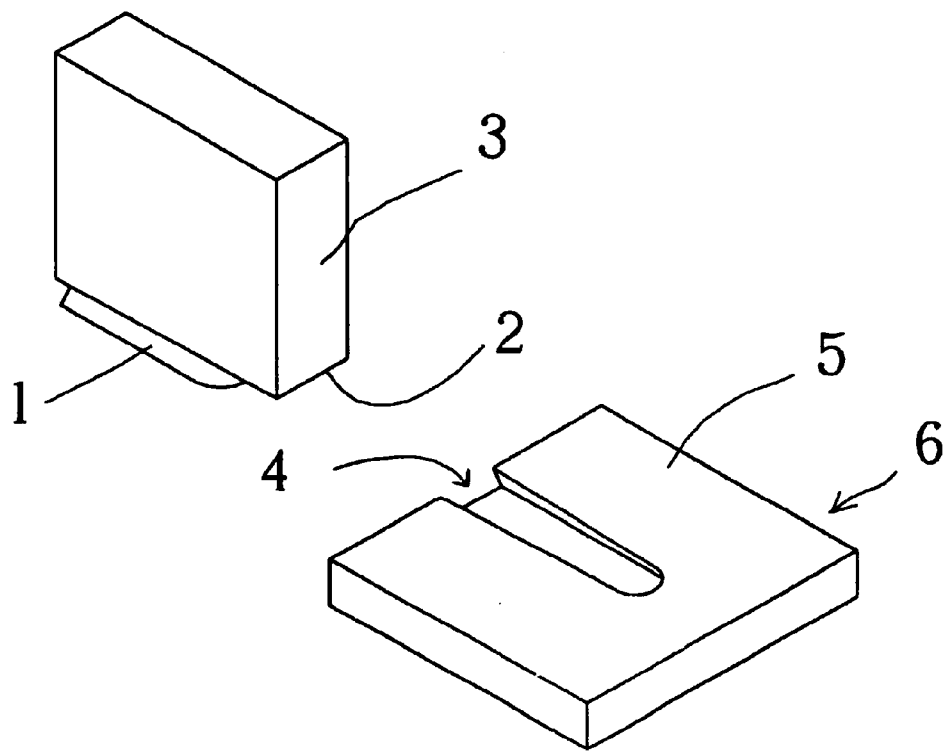
FIG. 1A is a perspective view of workpieces showing the pin and groove formed in accordance with one embodiment of the present invention.
Figure 1B:
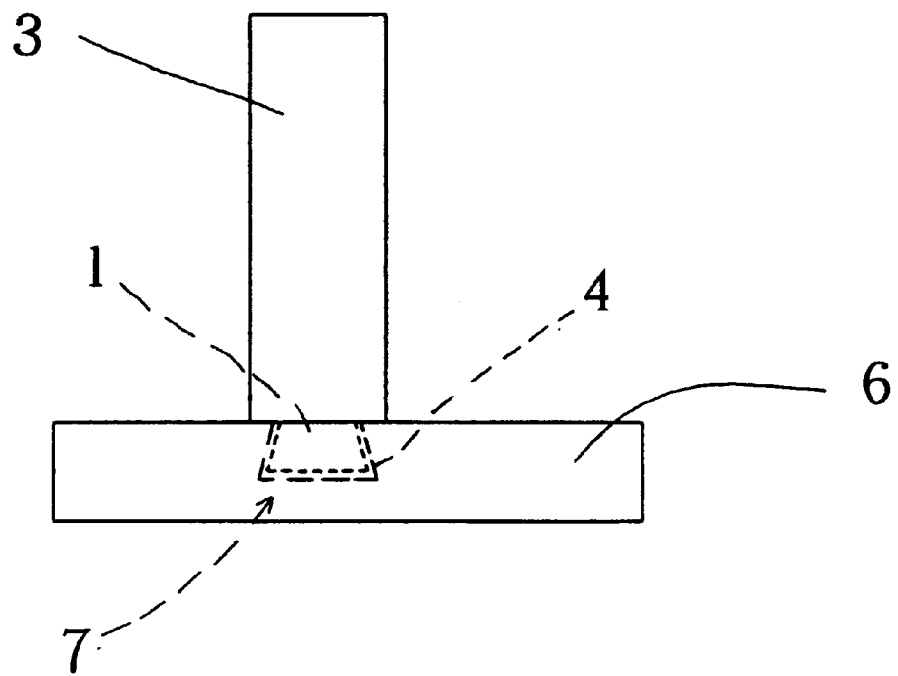
FIG. 1B is a side view of the workpieces of FIG. 1A shown joined together by a dovetail joint formed by inserting the pin of one workpiece into the groove of the other workpiece.

The present invention is directed to kit including one or more tools useful for forming dovetail joints, and the individual tools that may be included in the kit. As noted above, a dovetail joint is often used in woodworking and other crafts to hold workpieces together. Typically, a tapered sliding dovetail joint is formed by forcing a tapered dovetail pin formed on the end of a workpiece into a tapered sliding dovetail groove formed in another structure. FIG. 1A shows an exemplary embodiment of the components that typically make up a dovetail joint. The male portion, referred to herein as pin 1, is formed on the end 2 of a first workpiece 3. Female portion, referred to herein as groove 4, is formed into the joining side 5 of a second workpiece 6. FIG. 1B shows first workpiece 3 joined to second workpiece 6 by means of a dovetail joint 7 formed by sliding the pin 1 of workpiece 3 into the groove 4 of workpiece 6. The pin 1 should fit snugly into the groove 4 such that when the pin 1 is in its final position within the groove 4 that a joint 7 with adequate strength for the desired purpose is provided. Further, in many instances, it is desirable for the joint 7 to be snug throughout much, if not all, of its length. However, for simplicity, it is desirable to be able to slide the pin 1 into the groove 4 with reasonable force, that is by hand or with the assistance of hand tools such as a mallet, hammer, etc. Accordingly, it is often preferred to taper either the pin 1 or groove 4, or both to allow for ease of use without significantly reducing the strength or snug fit of the joint 7. The present invention provides the tooling necessary to make such tapered sliding dovetail grooves and/or pins with conventional hand-held tools, such as routers.

Tapered Sliding Dovetail Guide Plate

Figure 2:
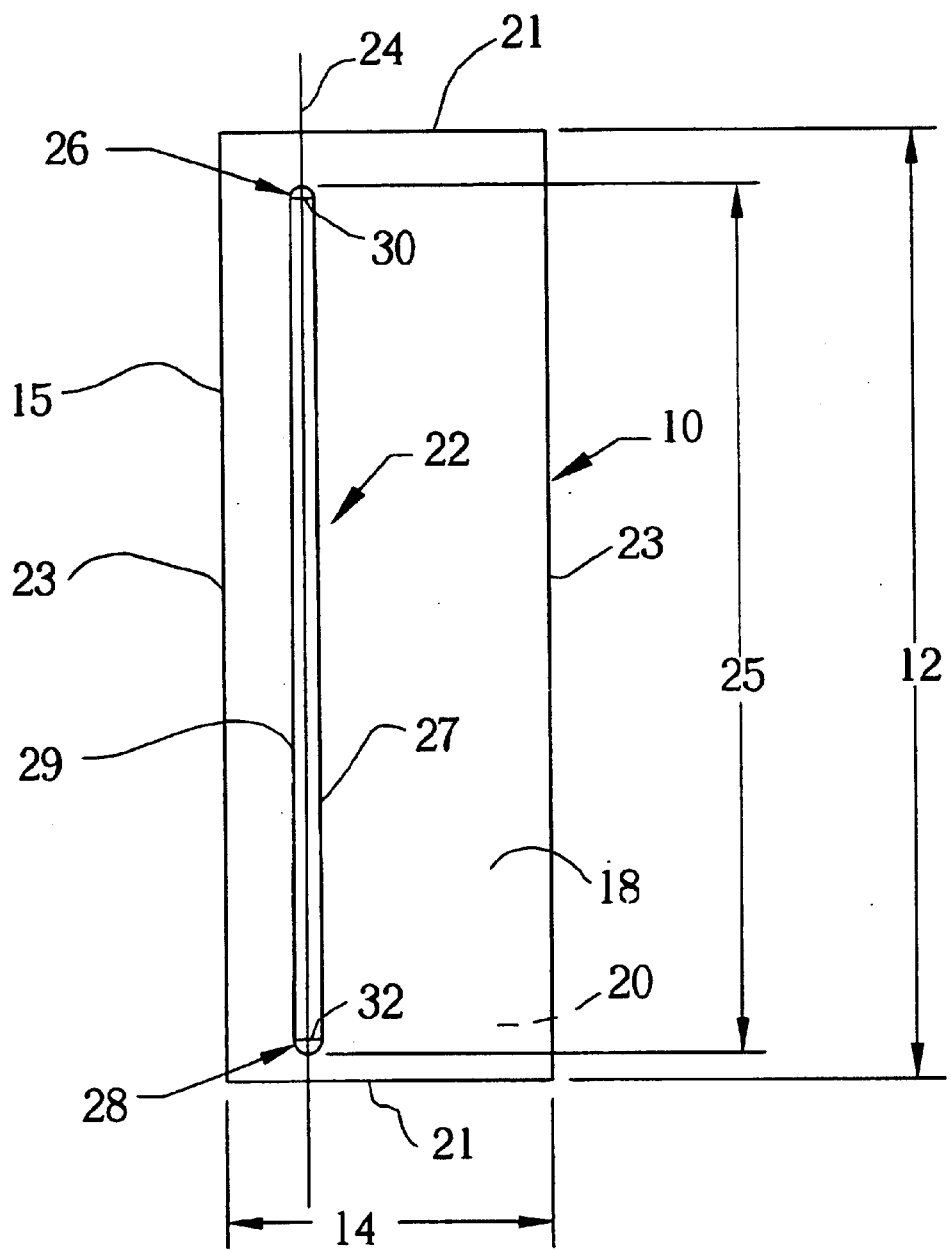
FIG. 2A is a plan view of one exemplary embodiment of a tapered sliding dovetail guide plate.
FIG. 2B is an end view of the tapered sliding dovetail guide plate shown in FIG. 2A.

FIGS. 2A and 2B shows one exemplary embodiment of a tapered sliding dovetail guide plate 10. The guide plate 10 is used to guide a tool such as a router over a workpiece when the user is cutting a tapered sliding dovetail groove into the workpiece. The guide plate 10 shown in FIG. 2 has a length 12, a width 14, a thickness 16, a top surface 18, an opposed bottom surface 20 and a perimeter 15 including a pair of end edges 21 and a pair of longitudinal edges 23. The guide plate 10 also includes at least one guide groove 22 through which the cutting mechanism of a router or other cutting tool may be passed. (For simplicity, a single guide groove will be described, however, it is contemplated that more than one guide groove 22 can be disposed in a guide plate 10.) The guide groove 22 passes completely through the thickness 16 of the plate 10 from the top surface 18 to the bottom surface 20. The guide groove 22 has a longitudinal centerline 24, a groove length 25, a first end 26, a second end 28, and a pair of longitudinal side edges 27 and 29. In the shown embodiment, the guide groove 22 is tapered in width from its first end 26 to its second end 28. Thus, the first end 26 of the guide groove 22 has minor width 30 that is less than the major width 32 of the guide groove 22 at its second end 28.

The guide groove 22 can be located anywhere on the plate 10 and can have any groove length 25. (If multiple guide grooves are formed in the plate 10, the guide grooves 22 can be the same or different in any desirable aspect.) At least the first end 26 the guide groove 22 should be located longitudinally inward from the corresponding end edge 21 of the plate 10. This allows for cutting an accurate half-blind groove, i.e. the first end 26 the guide groove 22 is located inward from the edge of the workpiece and thus, can't be seen when the joint is put together. It may also be preferred to locate the first end 26 of the guide groove 22 at a particular location with respect to the edge 21 of the plate 10. That is, it may be useful to locate the first end 21 of the groove 10 at a distance from the corresponding end 21 of the plate 10 such that typical router tools will not cut past the end of the workpiece when the end edge 21 of the plate 10 is lined up with the edge of the workpiece. The location of the first end 26 may also affect the strength of the joint and will often be coordinated with the location of the pin on the workpiece to be joined to the grooved workpiece.

In certain embodiments, as shown in FIG. 2A, the longitudinal centerline 24 of the guide groove 22 may be generally parallel to at least one of the longitudinal edges 23 of the plate 10. Further, the longitudinal centerline 24 of the guide groove 22 may be a particular distance from the longitudinal edge 23 of the guide plate 10. This can help provide the user with a reference point from which the location of the groove in the workpiece will be located after the cut is made. Accordingly, although not critical to the invention, the location of the guide groove 22 in the plate 10 may be chosen so as to help the user properly locate the device during use and/or the groove to be cut into the workpiece.

In one exemplary embodiment, the longitudinal centerline 24 of the guide groove 22 may be located about 1.75 in (about 4.2 cm) from one of the longitudinal edges 23 of the plate 10. Further, the first end 26 of the guide groove 22 may be located about 1 inch (about 2.54 cm) from one of the end edges 21 of the plate 10. The minor width 30 may be about 7/16 inch (about 1.112 cm), having a 7/32 inch (about 0.556 cm), 180 degree radius. In certain preferred embodiments, it may be desirable to match the minor width 30 with the outside diameter of the router bushing that extends into the guide groove 22 when used (e.g. the bushing of the router tool or other cutting mechanism being used). This allows the cutter to terminate the tapered sliding dovetail groove 22 at a controlled diameter that can be matched to the diameter of the corresponding tapered sliding dovetail pin. Accordingly, when the pin is inserted into the groove 22, it will lock in place.

The guide groove 22 may be tapered so as to increase the width of the guide groove 22 as one moves from the first end 26 to the second end 28. In one embodiment, the taper may be such that the width of the groove 24 increases by 1/16 of an inch (about 0.158 cm) every foot (about 30.48 cm) of length, or about 0.2984 degrees. In a preferred embodiment, the guide groove 22 should have a second end 28 with a major width 32 that is at least about 1/2 inch (about 1.27 cm). This allows for easy insertion of a 1/2 inch (about 1.27 cm) cutting tool to be passed through the guide groove 22 without risking damage to the guide groove 22 or cutting tool. It should be noted that the groove 22 may be tapered along one or both of its longitudinal sides 27 and 29. That is, one or both of the longitudinal sides 27 and/or 29 may be nonparallel to the longitudinal centerline 24 of the groove 22. In a preferred embodiment, both longitudinal sides 27 and 29 are nonparallel to the longitudinal centerline 24 and each other.

The tapered sliding dovetail guide plate 10 may be made of any dimensionally stable material, including materials such as aluminum, steel, other metals, plastics, wood, etc. The thickness 16 of the guide plate 10 can be any practical thickness for any particular use. In certain embodiments, it has been found to be desirable to have a thickness 16 of about 1/4 inch (about 0.635 cm). One exemplary suitable guide plate 10 may be made from about 1/4 inch (about 0.635 cm) thick aluminum plate. Although the length 12 and width 14 of the plate 10 can be any suitable dimension, for typical woodworking purposes, a length of between about 6 inches and about 35 inches (about 15.24 cm–88.9 cm) and a width of between about 5 and about 10 inches (about 12.7 cm–25.4 cm) has been found to work well.

Tapered Sliding Dovetail Pin Guide

Figure 3A:
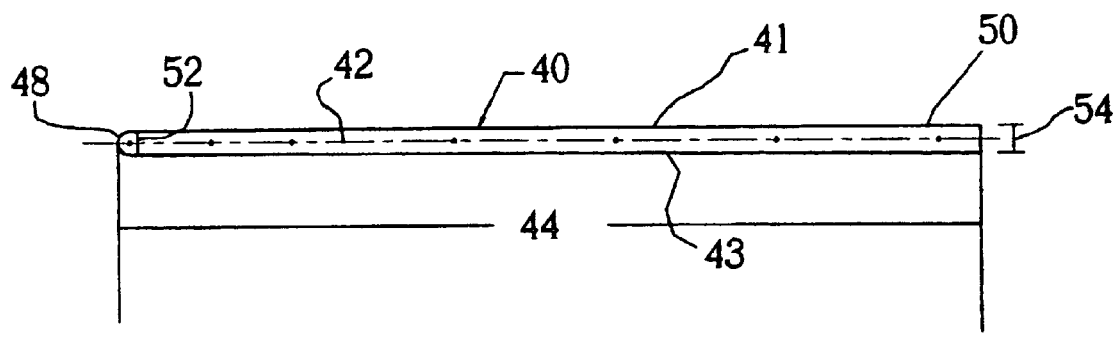
FIG. 3A is a plan view of an embodiment of a tapered sliding dovetail pin guide.
Figure 3B:
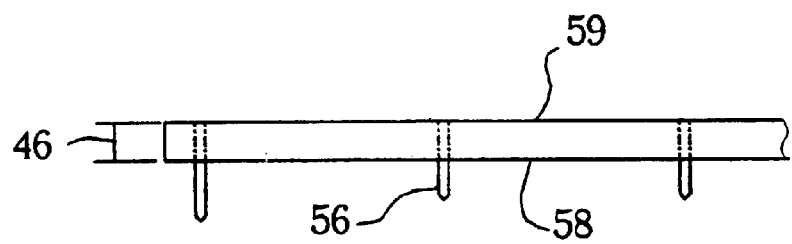
FIG. 3B is a partial side view of the tapered sliding dovetail pin guide shown in FIG. 3A.
Figure 3C:
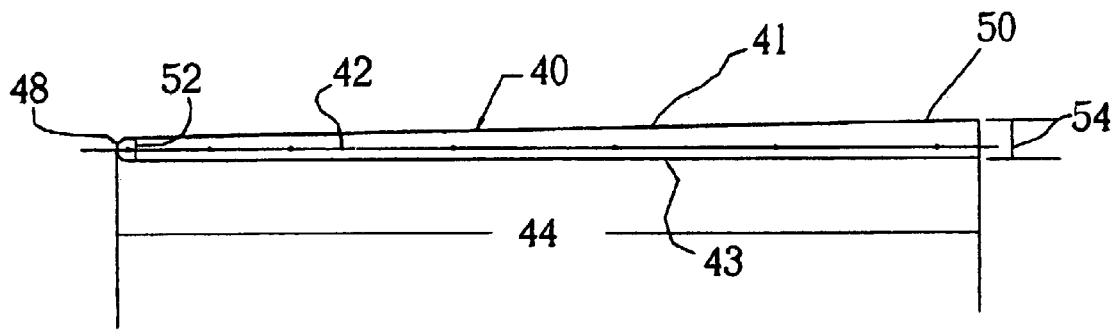
FIG. 3C is a plan view of another embodiment of a tapered sliding dovetail pin guide.

FIGS. 3A and 3B show an example of the tapered sliding dovetail pin guide of the present invention. The tapered sliding dovetail pin guide 40 is used to guide a router or other cutting mechanism during the forming of a pin on the end of a workpiece. In normal use, the pin of the workpiece is slid into a dovetail groove, such as the dovetail groove formed by the guide plate 10 of the present invention, so as to form a dovetail joint. However, with conventional hand tools, it is generally very difficult to form a pin that will slide into a corresponding groove without undue effort and form a strong joint. Thus, it has been found advantageous to use the tapered sliding dovetail pin guide 40 of the present invention to form the pin.

As shown in FIGS. 3A and 3B, the tapered sliding dovetail pin guide 40 comprises a generally oblong member having a longitudinal centerline 42, a length 44, a thickness 46, a workpiece side 58, a tool side 59 and two opposed ends, a minor end 48 and a major end 50. The minor end 48 of the pin guide 40 has a minor width 52 and the major end 50 has a major width 54 that is larger than the minor width 52. Thus, the pin guide 40 tapers in width from the major end 50 to the minor end 48. Although the taper of the pin guide 40 can be any desirable amount, a has been found that for typical woodworking projects, a taper from about 0.1 degrees to about 3.0 degrees works well. In certain preferred embodiments; a taper of about 0.2984 degrees has been found to be desirable. Typically, it is desirable for the taper of the pin guide 40 to match the taper of the groove guide 10. This helps ensure that the pin and groove will fit together snugly throughout their length if cut properly. However, embodiments are contemplated wherein the taper of the pin guide 40 is different from the taper of the guide groove 10 along some or all of the length of the devices. It is also possible to achieve the same effect by tapering only one side of the tapered sliding dovetail pin guide 40.

In the exemplary embodiment shown, the minor end 48 of the pin guide 40 is curved and the major end 50 is generally linear. However, either end can be curved or linear or any other suitable shape. The minor width 48 can be any suitable width for the desired end use of the device, however, a minor width in the range of about 0.33 inches to about 0.50 inches (about 0.838–1.27 cm) has been found to be suitable for most woodworking projects. In certain embodiments, a minor width of about 0.4375 inches (about 1.111 cm) has been found to be desirable. As with the taper of the pin guide 40, it may be desirable to correlate the minor width 48 of the pin guide 40 with the minor width 30 of the guide groove 22. This may help ensure that the minor end 48 of the pin can be forced completely into the corresponding end of the groove and yet provide a snug fit. However, embodiments are contemplated wherein the minor width 52 of the pin guide 40 is different from the minor width 30 of the guide groove 10. Further, as with the guide groove 22, the pin guide 40 may be tapered along one or both of its longitudinal sides 41 and 43. That is, one or both of the longitudinal sides 41 and/or 43 may be nonparallel to the longitudinal centerline 42 of the pin guide 40. In a preferred embodiment, both longitudinal sides 41 and 43 are nonparallel to the longitudinal centerline 42 and each other.

The exact length 44 and thickness 46 of the pin guide can vary depending on the desired end use for the device. However, in general, the length 44 of the pin guide 40 should be at least as long as the pin to be created. Further, for ease of use, it is desirable for the thickness 46 of the pin guide to be generally equal to the thickness 16 of the guide plate 10. This allows the same cutting tool to be used to cut both the pin and groove of the dovetail joint without changing the depth of the cutter.

As shown in FIG. 3B, the pin guide 40 of the present invention may also include one or more stabilizing pins 56 extending from the workpiece side 58 of the pin guide 40. The stabilizing pins 56 are useful to help temporarily tack the pin guide to the workpiece while the dovetail pin is being cut. The use of stabilizing pins 56 provides a means for attaching the pin guide 40 to the workpiece without the need for clamps or other devices that can obstruct the path of the cutting tool. The pin guide 40 can include any number of stabilizing pins 56 and the stabilizing pins 56 can be located anywhere on the workpiece side 58 of the pin guide 40. In the embodiment shown, the stabilizing pins 56 are located along the longitudinal centerline 42 of the pin guide 40 in relatively regular intervals. For typical woodworking projects, locating the stabilizing pins 56 about every 1 to 3 inches (about 2.54 cm–7.62 cm) works well.

The stabilizing pins 56 can all be the same or can be different in shape, dimension, make-up and/or any other property. In alternative embodiments, the pin guide 40 may include one or more holes through which pin, nails, screws or the like can be passed into the workpiece so as to stabilize the pin guide 40 when in use. In yet other embodiments, any suitable stabilizing means can be used, including but not limited to, adhesive, hook and loop fasteners, etc.

The pin guide 40 may be made of any dimensionally stable material, including materials such as aluminum, steel, other metals, plastics, wood, etc. In certain embodiments, it may be possible to cut the pin guide 40 from the guide plate 10 when forming the guide groove 22.

Router Stabilizer

Figure 4:
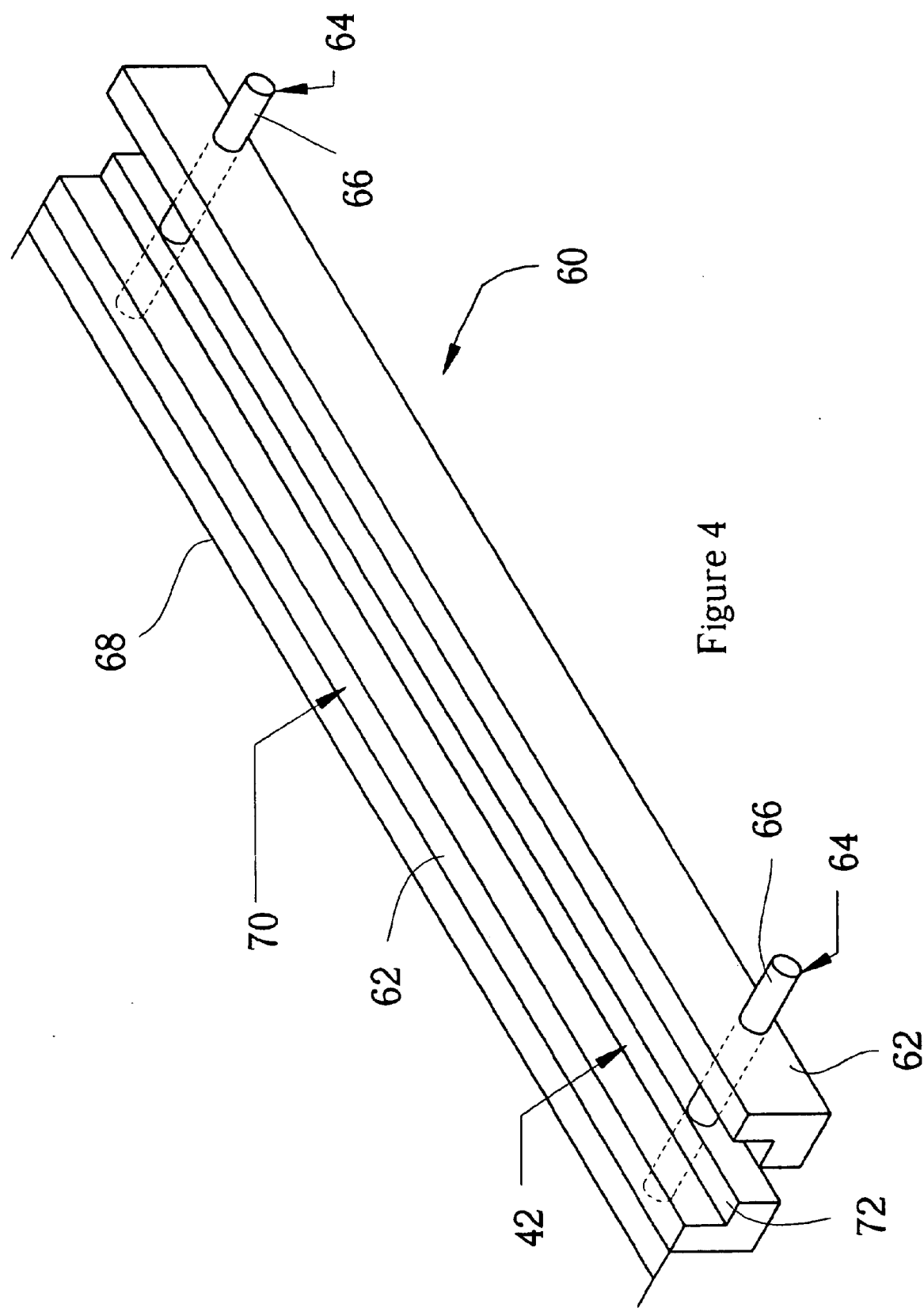
FIG. 4 is a prospective view of an exemplary embodiment of a router stabilizer suitable for use with the present invention.

FIG. 4 shows an exemplary embodiment of a router stabilizer 60 suitable for use with the present invention. The router stabilizer 60 can be used to help stabilize a router as it is used in conjunction with the pin guide 40 to cut a pin in a workpiece. This in turn, can help ensure that the pin will be more accurately cut than if cut without the use of the router stabilizer 60.

As shown in FIG. 4, the router stabilizer 60 may include two generally elongated rail members 62 disposed generally parallel to each other and held together by at least one spacing element 64, such as rods 66. In a preferred embodiment, the rail members 64 are moveable with respect to each other in at least a direction perpendicular to the length 68 of the rail members 62. Each rail member 62 preferably also includes a top surface 70 and a toe surface 72. The top surface 70 is shown in FIG. 4 to be at right angle to the toe surface 72, however, the surfaces can be at any angle with respect to each other. When clamped to the face of the workpiece, the toe surface 72 insures that the top surface 70 can be set to be in the same plane as the workpiece side 58 of the pin guide 40. This allows the pin guide 40 and router stabilizer 60 to work together to control the formation of the tapered sliding dovetail pin 1.

In one embodiment, as shown in FIG. 4, then rails 62 may be generally "L" shaped. The top of the "L" may form the top surface 70 on which a router or other tool may slide during use and the horizontally extending portion of the "L" may form the toe surface 72. In use, the toe surfaces 72 of the rails are generally located toward each other to form a space for the cutting tool to maneuver about the pin guide 40.

The router stabilizer 60 may be made of any dimensionally stable material, including materials such as aluminum, steel, other metals, plastics, wood, etc. In one embodiment, the stabilizer 60 is made from wood. The length of the rails 62 is not critical, however, it is desirable for the rails 62 to be at least as long as the pin to be cut. In certain embodiments, it is preferred that the rails 62 be at least about 3 inches (76.2 mm) longer than the pin guide 40 to be used such that the, cutting tool can be stabilized over the entire length of the pin forming operation.

In use, the workpiece with the pin guide 40 mounted on an end is sandwiched between the two rail members 62 of the router stabilizer 60. The rail members 62 may be clamped or otherwise held in position about the workpiece. The router or other cutting mechanism is placed on the router stabilizer 60 and slid along the top surface of the rails 62 when cutting the pin 1.

Depth of Cut Gage

Figure 5:
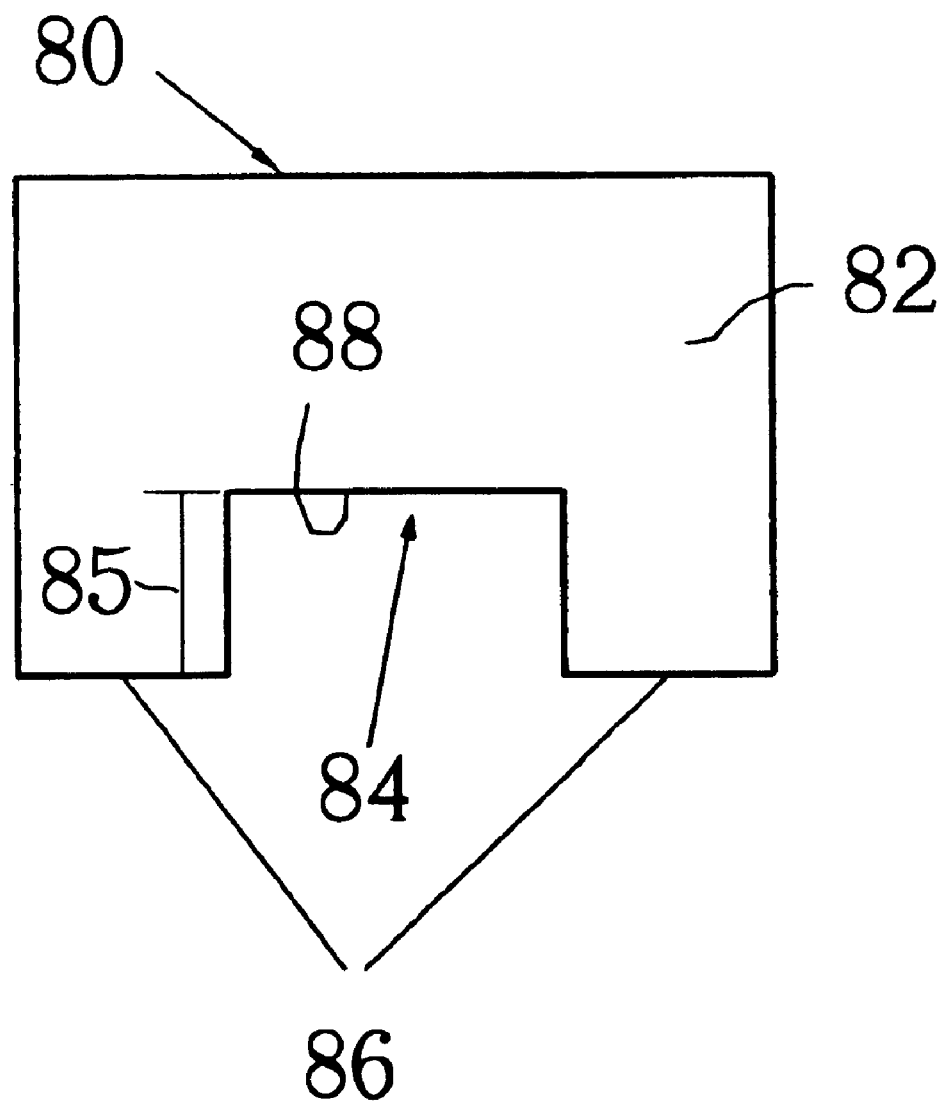
FIG. 5 is a plan view of an embodiment of a depth cut gage.

As shown in FIG. 5, the present invention may include a depth of cut gage 80. The gage 80 may be any size, shape or material that is provided with a means for properly setting the depth of the cutting tool to be used with the device of the present invention. In one embodiment, the depth gage 80 may be made from a block 82 of aluminum. In other embodiments, the dept of cut gage 80 may be formed in the router stabilizer 60, the tool package or any other tool or piece of a kit. The block 82 includes a recessed region 84 that can act as a guide for setting the depth 85 of a cutting tool. For example, when used with a router, the index surfaces 86 of the depth of cut gage 80 are placed on the sole of the router. This fixes the recessed surface 88 at a fixed distance over the router base. The router bit is then adjusted so that the cutter just contacts the recessed surface 88 of the depth of cut gage 80, and locked in place. This procedure fixes the dovetail cutter projection relative to the router sole plate and thus, ensures that the cut is the proper depth. The depth gage 80 may be configured to work with any cutting bit, any size pin guide and/or groove guide and any type of workpiece material.

Tapered Sliding Dovetail Tool Kit

The individual devices described above (i.e. the depth gage, the guide plate, the pin guide and the router stabilizer) can be used separately or in combination with each other or other devices. In certain embodiments, it may be advantageous to purchase or use more than one of the devices together. In such instances, the devices may for part or all of a kit. Although a kit could include any combination of the above described devices, in a preferred embodiment, the kit may include at least one depth gage 80, at least one guide plate 10, at least one pin guide 40 and at least one router stabilizer 60. Of course, the kit could also include other tools and/or devices that work with or separately from the devices described herein. For example, the kit may include a cutting tool such as a router and/or a router bit or other cutting bit. Further, the kit could include instructions for using one or more of the devices provided in the kit and may provide instructions as to the use of tools not included in the kit. The kit may also include a package to temporarily or permanently store the devices included in the kit and or other devices that may be useful to have in close proximity when using one or more of the devices of the kit. For example, the kit may include a carrying case for storing and carrying the tools included in the kit as well as other tools to be used with the tools of the kit.

While particular embodiments of the present invention have been illustrated and described, it would be obvious to those skilled in the art that various other changes and modifications can be made without departing from the spirit and scope of the invention. Further, it should be apparent that all combinations of such embodiments and features can result in preferred embodiments of the invention. It is therefore intended to cover in the appended claims all such changes and modifications that are within the scope of the invention.

I claim:

1. A template for making tapered sliding dovetail pins in a workpiece, the template comprising:

a dimensionally stable material having a longitudinal centerline, a pair of side edges, a workpiece side, a tool side, a minor end having a minor width and a major end having a major width that is larger than the minor width such that the template has a taper in width from the major end to the minor end, and at least one stabilizing member for holding the template in place while the sliding dovetail pin is being formed from the workpiece, the stabilizing member disposed on the workpiece side of the template and configured such that in use the stabilizing member does not extend significantly outwardly from the tool side of the template.

2. The template of claim 1 wherein the stabilizing member includes a pin extending from the workpiece side of the template.

3. The template of claim 1 wherein the template includes two or more stabilizing members.

4. The template of claim 1 wherein the template includes two or more pins extending from the workpiece side of the template.

5. The template of claim 1 wherein the stabilizing member includes pins, adhesive, hook and loop fasteners or a combination thereof.

6. The template of claim 1 wherein the stabilizing member includes pins, nails or screws that are permanently or temporarily passed through holes in the template.

7. The template of claim 1 wherein both of the side edges are nonparallel to the longitudinal centerline and each other.

8. The template of claim 1 wherein the taper in width from the major end to the minor end is between about 0.1 and about 3.0 degrees.

9. The template of claim 1 wherein the minor width is between about 0.33 inches and about 0.5 inches (about 0.838–1.27 cm).

10. A template for making tapered sliding dovetail pins in a workpiece, the template comprising:

a dimensionally stable material having a longitudinal centerline, a pair of side edges, a workpiece side, a tool side, a minor end having a minor width and a major end having a major width that is larger than the minor width such that the template has a taper in width from the major end to the minor end, wherein one of the side edges is parallel to the longitudinal centerline and the other of the side edges is nonparallel to the longitudinal centerline; and at least one stabilizing member disposed on the workpiece side of the template for holding the template in place while the sliding dovetail pin is being formed from the workpiece.

11. A kit for making tapered sliding dovetail joints, the kit including:

a pin guide having a longitudinal centerline, a thickness, a pair of side edges, a workpiece side, a tool side, a minor end having a minor width and a major end having a major width that is larger than the minor width such that the template has a taper in width from the major end to the minor end, wherein at least one stabilizing member is disposed on the workpiece side of the template for holding the template in place while the sliding dovetail pin is being formed from the workpiece, and a groove guide made from a plate having a length, a width, a thickness, a top surface, a bottom surface, a perimeter and at least one groove having a longitudinal centerline, a pair of groove edges, a first end having a minor width and a second end having a major width that is larger than the minor width, wherein the first end of the groove is located inward from the perimeter of the plate.

12. The kit of claim 11 wherein the thickness of the pin guide is substantially the same as the thickness of the groove guide.

13. The kit of claim 11 wherein the taper of the pin guide is substantially the same as the taper of the groove guide.

14. The kit of claim 11 wherein the pin guide includes two or more pins extending from the workpiece side of the pin guide.

15. The kit of claim 11 wherein the pin guide and the groove guide taper in width between about 0.1 degrees and about 3.0 degrees.

16. The kit of claim 11 wherein the pin guide and the groove guide taper in width about 1/16 of an inch (about 0.158 cm) per foot (about 30.48 cm).

17. The kit of claim 11 wherein the guide groove has a major width of at least about ½ inch (about 1.27 cm).

18. The kit of claim 11 further including a router stabilizer, the router stabilizer comprising:

a first rail member, a second rail member, and at least one spacing element, the spacing element providing a means for holding the first rail member and the second rail member in a desired configuration with respect to each other.

19. The kit of claim 11 wherein the first rail of the router stabilizer has an L shape defining a top surface on which a router tool can slide and a toe surface against which a workpiece can be positioned.

20. The kit of claim 11 wherein both the first rail and the second rail of the router stabilizer have an L shape defining a top surface on which a router tool can slide and a toe surface against which a workpiece can be positioned, and wherein the first rail and second rail are oriented such that the toe surface of the first rail is disposed toward the toe surface of the second rail during use.

21. The kit of claim 11 wherein the spacing element allows for slideable adjustment of the first rail in relation to the second rail.

22. The kit of claim 11 further including a dept of cut gage.

23. The kit of claim 22 wherein the depth of cut gage is formed in the router stabilizer.

24. The kit of claim 11 further including instructions for using pin guide and/or the groove guide.

25. The kit of claim 11 further including a package for storing the pin guide and the groove guide.

* * * * *